(12) United States Patent
Takaku et al.

(10) Patent No.: US 7,718,086 B2
(45) Date of Patent: May 18, 2010

(54) DICHROIC DYE, AND LIQUID CRYSTAL COMPOSITION AND LIQUID CRYSTAL DEVICE USING THE SAME

(75) Inventors: Koji Takaku, Kanagawa (JP); Takashi Kato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 102 days.

(21) Appl. No.: 11/976,560

(22) Filed: Oct. 25, 2007

(65) Prior Publication Data

US 2008/0099724 A1 May 1, 2008

(30) Foreign Application Priority Data

Oct. 27, 2006 (JP) ............... 2006-292812

(51) Int. Cl.
*C09K 19/00* (2006.01)
*C09K 19/06* (2006.01)
*C09K 19/52* (2006.01)

(52) U.S. Cl. ............... 252/299.1; 252/299.01; 252/299.6; 252/299.61; 430/20; 428/1.1

(58) Field of Classification Search ............ 252/299.01, 252/299.1, 299.6, 299.61; 430/20; 428/1.1
See application file for complete search history.

(56) References Cited

U.S. PATENT DOCUMENTS 5,026,505 A 6/1991 Kaneko et al.

2008/0099724 A1* 5/2008 Takaku et al. ............ 252/299.1

FOREIGN PATENT DOCUMENTS

JP 58-57488 A 4/1983
JP 2003-113378 A 4/2003

OTHER PUBLICATIONS

Handbook of Liquid Crystals, vol. 2A, Chapter 3.4, pp. 257-302 (1998).

* cited by examiner

*Primary Examiner*—Geraldina Visconti
(74) *Attorney, Agent, or Firm*—Birch, Stewart, Kolasch & Birch, LLP

(57) ABSTRACT

The present invention provides one or more dichroic dyes which exhibit high solubility in liquid crystal and a high order parameter. The dichroic dyes each have a first substituent having at least one cis-cyclohexane ring and/or a second substituent having at least one trans-cyclohexane ring. The dichroic dye(s) may be provided as a mixture including at least a first dichroic dye having at least the first substituent and a second dichroic dye having at least the second substituent. The dichroic dye(s) may also be provided as a plurality of dichroic dyes, each of the molecules of which has at least the first substituent and the second substituent. The present invention also provides a liquid crystal composition and a liquid crystal element including the one or more dichroic dyes.

17 Claims, No Drawings

DICHROIC DYE, AND LIQUID CRYSTAL COMPOSITION AND LIQUID CRYSTAL DEVICE USING THE SAME

CROSS-REFERENCE TO RELATED APPLICATION

This application claims priority under 35 USC 119 from Japanese Patent Application No. 2006-292812, the disclosure of which is incorporated by reference herein.

BACKGROUND OF THE INVENTION

1. Field of Invention

The present invention relates to a dichroic dye and applications thereof, and particularly relates to a liquid crystal composition and a liquid crystal element using the dichroic dye.

2. Description of the Related Art

Many systems have been proposed for liquid crystal elements (liquid crystal display devices). In particular, guest-host liquid crystal elements are expected to serve as liquid crystal elements providing a bright display. A guest-host liquid crystal element includes a dichroic dye dissolved in a liquid crystal, in which the orientation of the dichroic dye changes in accordance with the movement of the liquid crystal under an electric field, thereby changing the light absorption of the liquid crystal element to display an image.

The guest-host system is described in various documents (for example, see Handbook of Liquid Crystals, Vol. 2A, Chapter 3.4, pp. 257-302, written by B. Bahadur, edited by D. Demus, J. Goodby, G. W. Gray, H. W. Spiess, and V. Vill, published by Wiley-VCH, 1998). Dichroic dyes used in guest-host liquid crystal elements are required to have, for example, appropriate absorption properties, high order parameters, high solubility in host liquid crystals, and durability. In order to satisfy these requirements, dichroic dyes having a substituent containing a cyclohexane ring and a structure similar to that of the host liquid crystal have been reported (for example, see Japanese Patent Application Laid-Open (JP-A) No. 58-57488 and JP-A No. 2003-113378).

These patent documents report that a trans-cyclohexane ring exhibits a high order parameter, while a cis-cyclohexane ring significantly decreases the order parameter. However, the trans-cyclohexane ring is not sufficiently soluble in a liquid crystal to provide a high contrast display, and improvement has been required in this regard.

SUMMARY OF THE INVENTION

The present invention provides a plurality of dichroic dyes which have high solubility in liquid crystal and exhibit a high order parameter. The invention also provides a liquid crystal composition and a liquid crystal element using the plurality of dichroic dyes.

Namely, the invention provides (1) a plurality of dichroic dyes, each molecule of which independently comprises at least one of a first substituent having at least one cis-cyclohexane ring and a second substituent having at least one trans-cyclohexane ring, the plurality of dichroic dyes comprising:

at least one dichroic dye having at least the first substituent; and at least one dichroic dye having at least the second substituent, which may be the same as or different from the at least one dichroic dye having at least the first substituent.

The invention further provides (2) the plurality of dichroic dyes of item (1), being a dichroic dye mixture comprising:

a first dichroic dye comprising the first substituent having at least one cis-cyclohexane ring; and a second dichroic dye, comprising the second substituent having at least one trans-cyclohexane ring, and which is different from the first dichroic dye.

The invention further provides (3) the plurality of dichroic dyes of item (2), wherein a ratio of the number of the cis-cyclohexane rings included in the dichroic dye mixture to the number of the trans-cyclohexane rings included in the dichroic dye mixture (the number of the cis-cyclohexane rings:the number of the trans-cyclohexane rings) is in a range of from 20:80 to 50:50.

The invention further provides (4) the plurality of dichroic dyes of item (2), wherein the first substituent and the second substituent are each independently represented by the following Formula (1):

$$\text{-(Het)}_s\text{-}((D^1)_e\text{-}(L^1)_f)_m\text{-}(D^2)_k\text{-}T^1 \qquad \text{Formula (1)}$$

wherein Het represents an oxygen or sulfur atom; $D^1$ and $D^2$ each independently represent a bivalent arylene group, a bivalent heteroarylene group, or a bivalent alicyclic hydrocarbon group; at least one of $D^1$ and $D^2$ of the first substituent is a cis-cyclohexanediyl group; at least one of $D^1$ and $D^2$ of the second substituent is a trans-cyclohexanediyl group; $L^1$ represents a bivalent connecting group; $T^1$ represents an alkyl group, an alkoxy group, an alkoxycarbonyl group, an acyloxy group, a halogen atom, or a cyano group; s represents 0 or 1; e represents an integer from 1 to 3, wherein a plurality of $D^1$ may be the same as or different from each other when e is 2 or 3; m represents an integer from 1 to 3, wherein a plurality of $D^1$ may be the same as or different from each other when m is 2 or 3; a plurality of $L^1$ may be the same as or different from each other; k is 1 or 2, wherein a plurality of $D^2$ may be the same as or different from each other when k is 2; f represents an integer from 0 to 3, wherein a plurality of $L^1$ represent different connecting groups when f is 2 or 3; the total number of the groups represented by $D^1$ and $D^2$ (e×m+k) is an integer from 2 to 5, wherein a plurality of $D^1$ and $D^2$ may be the same as or different from each other when e and k are each 2 or more, and a plurality of $((D^1)_e\text{-}(L^1)_f)$ may be the same as or different from each other when m is 2 or more.

The invention further provides (5) the plurality of dichroic dyes of item (4), wherein in the first substituent, $D^2$ is a cis-cyclohexanediyl group and $T^1$ is an alkyl group, and wherein in the second substituent, $D^2$ is a trans-cyclohexanediyl group and $T^1$ is an alkyl group.

The invention further provides (6) the plurality of dichroic dyes of item (5), wherein $T^1$ in the first substituent and $T^1$ in the second substituent each independently represent an alkyl group having 3 to 10 carbon atoms.

The invention further provides (7) the plurality of dichroic dyes of item (1), wherein each molecule independently comprises a first substituent having at least one cis-cyclohexane ring and a second substituent having at least one trans-cyclohexane ring.

The invention further provides (8) the plurality of dichroic dyes of item (7), wherein a ratio of the number of the cis-cyclohexane rings to the number of the trans-cyclohexane rings included in the plurality of dichroic dyes (the number of the cis-cyclohexane rings:the number of the trans-cyclohexane rings) is in a range of 20:80 to 50:50.

The invention further provides (9) the plurality of dichroic dyes of item (7), wherein the first substituent and the second substituent are each independently represented by the following Formula (1):

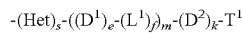

Formula (1)

wherein Het represents an oxygen or sulfur atom; $D^1$ and $D^2$ each independently represent a bivalent arylene group, a bivalent heteroarylene group, or a bivalent alicyclic hydrocarbon group; at least one of $D^1$ and $D^2$ in the first substituent is a cis-cyclohexanediyl group; at least one of $D^1$ and $D^2$ in the second substituent is a trans-cyclohexanediyl group; $L^1$ represents a bivalent connecting group; $T^1$ represents an alkyl group, an alkoxy group, an alkoxycarbonyl group, an acyloxy group, a halogen atom, or a cyano group; s represents 0 or 1; e represents an integer from 1 to 3, wherein a plurality of $D^1$ may be the same as or different from each other when e is 2 or 3; m represents an integer from 1 to 3, wherein a plurality of $D^1$ may be the same as or different from each other when m is 2 or 3; a plurality of $L^1$ may be the same as or different from each other; k is 1 or 2, wherein a plurality of $D^2$ may be the same as or different from each other when k is 2; f represents an integer from 0 to 3, wherein a plurality of $L^1$ represent different connecting groups when f is 2 or 3; the total number of the groups represented by $D^1$ and $D^2$ (exm+k) is an integer from 2 to 5, wherein a plurality of $D^1$ and $D^2$ may be the same as or different from each other when e and k are each 2 or more, and a plurality of $((D^1)_e\text{-}(L^1)_f)$ may be the same as or different from each other when m is 2 or more.

The invention further provides (10) the plurality of dichroic dyes of item (9), wherein in the first substituent, $D^2$ is a cis-cyclohexanediyl group and $T^1$ is an alkyl group, and wherein in the second substituent, $D^2$ is a trans-cyclohexanediyl group and $T^1$ is an alkyl group.

The invention further provides (11) the plurality of dichroic dyes of item (10), wherein $T^1$ in the first substituent and $T^1$ in the second substituent each independently represent an alkyl group having 3 to 10 carbon atoms.

The invention further provides (12) a liquid crystal composition comprising:
the plurality of dichroic dyes of item (1); and
a liquid crystal compound.

The invention further provides (13) the liquid crystal composition of item (12), comprising the plurality of dichroic dyes of item (2).

The invention further provides (14) the liquid crystal composition of item (12), comprising the plurality of dichroic dyes of item (7).

The invention further provides (15) a liquid crystal element comprising:
a pair of electrodes, at least one of which is a transparent electrode; and
a liquid crystal layer interposed between the pair of electrodes,
wherein the liquid crystal layer comprises the liquid crystal composition of item (12).

The invention further provides (16) the liquid crystal element of item (15), comprising the plurality of dichroic dyes of item (2).

The invention further provides (17) the liquid crystal element of item (15), comprising the plurality of dichroic dyes of item (7).

According to the invention, a plurality of dichroic dyes which have a high solubility in liquid crystal and exhibit a high order parameter can be provided. Further, according to the invention, a liquid crystal composition and a liquid crystal element using the plurality of dichroic dyes can be provided.

DETAILED DESCRIPTION OF THE INVENTION

The present invention will be described in detail below. In the present specification "(numeral) to (numeral)" indicates a range including the numerical values indicated before and after "to" as a minimum value and a maximum value, respectively.

Dichroic Dyes

A plurality of dichroic dyes used in the invention each have, in a molecule thereof, at least one of a first substituent having at least one cis-cyclohexane ring and a second substituent having at least one trans-cyclohexane ring. The plurality of dichroic dyes include: at least one dichroic dye having at least the first substituent; and at least one dichroic dye having at least the second substituent, which may be the same as or different from the at least one dichroic dye having at least the first substituent. In the invention, a dichroic dye mixture including: a first dichroic dye including the first substituent having at least one cis-cyclohexane ring; and a second dichroic dye, including the second substituent having at least one trans-cyclohexane ring, and which is different from the first dichroic dye is used. In the invention, a plurality of dichroic dyes, in which each molecule independently includes a first substituent having at least one cis-cyclohexane ring and a second substituent having at least one trans-cyclohexane ring are also used.

In general, a plurality of dichroic dyes each having at least one substituent including at least one cyclohexane ring include at least one of a cis-cyclohexane ring and a trans-cyclohexane ring. Accordingly, solubility in liquid crystal is high, while the order parameter is known to decrease when the ratio of the cis-cyclohexane ring is excessive.

As a result of extensive investigation, the inventors of the invention have found that attachment of at least one substituent containing a cis- or trans-cyclohexane ring to a dye matrix can attain an unexpected effect of achieving a good balance between solubility in liquid crystal and the order parameter.

In other words, the trans-cyclohexane ring exhibits a high order parameter while exhibiting insufficient solubility in liquid crystal. On the other hand, the cis-cyclohexane ring significantly decreases the order parameter. However, according to the finding of the inventors, a mixture of cis-cyclohexane and trans-cyclohexane rings provides a high order parameter owing to the property of the trans-cyclohexane ring and a high solubility in liquid crystal owing to the property of the cis-cyclohexane ring.

Additional study was conducted on the basis of the finding, and the invention was thus accomplished.

Hereinafter, the cis- and trans-cyclohexane rings may be referred to as "specific cyclohexane rings", and a plurality of substituents each having two or more ring structures which include one of the specific cyclohexane rings may each be referred to as "the substituent according to the invention".

As long as the substituent according to the invention has one of the specific cyclohexane rings and two or more ring structures, the structure of the dye matrix to which the substituent is connected, the number of the substituents according to the invention bonded to the dye matrix, and the position on the dye matrix to which the substituent according to the invention is connected, are not particularly limited.

In the specific cyclohexane rings contained in the plurality of dichroic dyes of the invention, the ratio of the number of cis-cyclohexane rings to the number of trans-cyclohexane rings (cis:trans) is in the range of 1:99 to 99:1. From the viewpoint of achieving a good balance between the order parameter and solubility in liquid crystal, the ratio is preferably in the range of 5:95 to 75:25, more preferably 10:90 to 60:40, and particularly preferably 20:80 to 50:50.

The substituent according to the invention has two or more ring structures for the purpose of increasing an aspect ratio of the dye to increase the order parameter of the dye.

The ring structures include one of the specific cyclohexane rings. All of the two or more ring structures may be composed of the specific cyclohexane rings, or the two or more ring structures may further contain a ring structure other than the specific cyclohexane rings. Examples of the other ring structure include an aromatic ring, a heterocycle, and an aliphatic ring. The other ring structure preferably has a six-membered ring structure. These ring structures may each have a substituent. Examples of the substituent include those listed in the "substituent groups V" section described below.

In the invention, the substituent according to the invention is preferably represented by the following Formula (1).

-(Het)$_s$-((D$^1$)$_e$-(L$^1$)$_j$)$_m$-(D$^2$)$_k$-T$^1$    Formula (1)

In Formula (1), Het represents an oxygen atom, a sulfur atom, or NH.

D$^1$ and D$^2$ each independently represent a bivalent arylene group, a bivalent heteroarylene group, or a bivalent alicyclic hydrocarbon group. At least one of D$^1$ and D$^2$ is either of the specific cyclohexane rings (that is, a cis-cyclohexanediyl group or a trans-cyclohexanediyl group). D$^2$ is preferably a cyclohexane ring.

When the plurality of dichroic dyes include a first dichroic dye including the first substituent having at least one cis-cyclohexane ring and a second dichroic dye, comprising the second substituent having at least one trans-cyclohexane ring, and which is different from the first dichroic dye, at least one of D$^1$ and D$^2$ of the first substituent is a cis-cyclohexanediyl group; at least one of D$^1$ and D$^2$ of the second substituent is a trans-cyclohexanediyl group.

When the plurality of dichroic dyes each include, in a molecule thereof, a first substituent having at least one cis-cyclohexane ring and a second substituent having at least one trans-cyclohexane ring, at least one of D$^1$ and D$^2$ in the first substituent is a cis-cyclohexanediyl group; at least one of D$^1$ and D$^2$ in the second substituent is a trans-cyclohexanediyl group.

When the specific cyclohexane rings are used in Formula (1), the ratio of the number of cis-cyclohexane rings to the number of trans-cyclohexane rings (cis:trans) in the plurality of dichroic dyes is in the range of 1:99 to 99:1. From the viewpoint of achieving a good balance between the order parameter and solubility in liquid crystal, the ratio is preferably in the range of 5:95 to 75:25, more preferably 10:90 to 60:40, and particularly preferably 20:80 to 50:50.

The arylene group represented by D$^1$ or D$^2$ is preferably an arylene group having 6 to 20 carbon atoms, more preferably having 6 to 10 carbon atoms. Preferred examples of the arylene group include phenylene and naphthalene groups such as a 1,4-phenylene group, a naphthalene-2,6-diyl group, or a tetrahydronaphthalene-2,6-diyl group.

The heteroarylene group represented by D$^1$ or D$^2$ is preferably a heteroarylene group having 1 to 20 carbon atoms, more preferably having 2 to 9 carbon atoms. Preferred examples of the heteroarylene group include heteroarylene groups such as pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring, or triazole ring, and fused rings thereof, of which two hydrogen atoms are removed respectively from two carbon atom. The heteroarylene group particularly preferably has a six-membered ring structure.

The bivalent alicyclic hydrocarbon group represented by D$^1$ or D$^2$ is preferably a bivalent alicyclic hydrocarbon group having 3 to 20 carbon atoms, more preferably having 4 to 12 carbon atoms. Preferred examples of the bivalent alicyclic hydrocarbon group include a cyclohexanediyl group and a decahydronaphthalenediyl group, more preferably a cyclohexane-1,4-diyl group and a decahydronaphthalene-2,6-diyl group.

The bivalent arylene group, the bivalent heteroarylene group and the bivalent alicyclic hydrocarbon group each represented by D$^1$ or D$^2$ may have be substituted or unsubstituted. In the Formula (1), when e, m or k is 2 or more, multiple groups D$^1$ or D$^2$ may be substituted or unsubstituted independently, and the multiple substituents may be the same as or different from each other, or may be unsubstituted.

Examples of the substituents include the following substituent groups V.

Substituent Groups V

Examples of the substituent groups V includes a halogen atom (such as chlorine, bromine, iodine, or fluorine), a mercapto group, a cyano group, a carboxyl group, a phosphate group, a sulfo group, a hydroxy group, a carbamoyl group having 1 to 10 carbon atoms, preferably 2 to 8 carbon atoms, more preferably 2 to 5 carbon atoms (such as a methylcarbamoyl group, an ethylcarbamoyl group, and a morpholinocarbamoyl group), a sulfamoyl group having 0 to 10 carbon atoms, preferably 2 to 8 carbon atoms, more preferably 2 to 5 carbon atoms (such as a methylsulfamoyl group, an ethylsulfamoyl group and a piperidinosulfamoyl group), a nitro group, an alkoxy group having 1 to 20 carbon atoms, preferably 1 to 10 carbon atoms, more preferably 1 to 8 carbon atoms (such as a methoxy group, an ethoxy group, a 2-methoxyethoxy group and a 2-phenylethoxy group), an aryloxy group having 6 to 20 carbon atoms, preferably 6 to 12 carbon atoms, more preferably 6 to 10 carbon atoms (such as a phenoxy group, a p-methylphenoxy group, a p-chlorophenoxy group, or a naphthoxy group), an acyl group having 1 to 20 carbon atoms, preferably 2 to 12 carbon atoms, more preferably 2 to 8 carbon atoms (such as an acetyl group, a benzoyl group, or a trichloroacetyl group), an acyloxy group having 1 to 20 carbon atoms, preferably 2 to 12 carbon atoms, more preferably 2 to 8 carbon atoms (such as an acetyloxy group or a benzoyloxy group), an acylamino group having 1 to 20 carbon atoms, preferably 2 to 12 carbon atoms, more preferably 2 to 8 carbon atoms (such as an acetylamino group), a sulfonyl group having 1 to 20 carbon atoms, preferably 1 to 10 carbon atoms, more preferably 1 to 8 carbon atoms (such as a methanesulfonyl group, an ethanesulfonyl group, or a benzenesulfonyl group), a sulfinyl group having 1 to 20 carbon atoms, preferably 1 to 10 carbon atoms, more preferably 1 to 8 carbon atoms (such as a methanesulfinyl group, an ethanesulfinyl group, or a benzenesulfinyl group), a substituted or unsubstituted amino group having 1 to 20 carbon atoms, preferably 1 to 12 carbon atoms, more preferably 1 to 8 carbon atoms (such as an amino group, a methylamino group, a dimethylamino group, a benzylamino group, an anilino group, a diphenylamino group, a 4-methylphenylamino group, a 4-ethylphenylamino group, a 3-n-propylphenylamino group, a 4-n-propylphenylamino group, a 3-n-butylphenylamino group, a 4-n-butylphenylamino group, a 3-n-pentylphenylamino group, a 4-n-pentylphenylamino group, a 3-trifluoromethylphenylamino group, a 4-trifluoromethylphenylamino group, a 2-pyridylamino group, a 3-pyridylamino group, a 2-thiazolylamino group, a 2-oxazolylamino group, an N,N-methylphenylamino group, or an N,N-ethylphenylamino group), an ammonium group having 0 to 15 carbon atoms, preferably 3 to 10 carbon atoms, more preferably 3 to 6 carbon atoms (such as a trimethylammonium group or a triethylammonium group), a hydrazino group having 0 to 15 carbon atoms, preferably 1 to 10 carbon atoms, and more preferably 1 to 6 carbon atoms (such as a trimethylhydrazino group), a ureido group having 1 to 15 carbon atoms, preferably 1 to 10 carbon atoms, more preferably 1 to 6 carbon atoms (such as a ureido group or an N,N-dimethylureido group), an imido group having 1 to 15 carbon atoms, and preferably 1 to 10 carbon atoms, more preferably 1 to 6 carbon atoms (such as a succineimide group), an alkylthio group having 1 to 20 carbon atoms, preferably 1 to 12 carbon atoms, more preferably 1 to 8 carbon atoms (such as a methylthio group, an ethylthio group, or a propylthio group), an arylthio group having 6 to 80 carbon atoms, preferably 6 to 40 carbon atoms, more preferably 6 to 30 carbon atoms (such as a phenylthio group, a p-methylphenylthio group, a p-chlorophenylthio group, a 2-pyridylthio group, a 1-naphthylthio group, a 2-naphthylthio group, a 4-propylcyclohexyl-4'-biphenylthio group, a 4-butylcyclohexyl-4'-biphenylthio group, a 4-pentylcyclohexyl-4'-biphenylthio group, or a 4-propylphenyl-2-ethynyl-4'-biphenylthio group), a heteroarylthio group having 1 to 80 carbon atoms, preferably 1 to 40 carbon atoms, and more preferably 1 to 30 carbon atoms (such as a 2-pyridylthio group, a 3-pyridylthio group, a 4-pyridylthio group, a 2-quinolylthio group, a 2-furylthio group, or a 2-pyrolylthio group), an alkoxycarbonyl group having 2 to 20 carbon atoms, preferably 2 to 12 carbon atoms, and more preferably 2 to 8 carbon atoms (such as a methoxycarbonyl group, an ethoxycarbonyl group, or a 2-benzyloxycarbonyl group), an aryloxycarbonyl group having 6 to 20 carbon atoms, preferably 6 to 12 carbon atoms, and more preferably 6 to 10 carbon atoms (such as a phenoxycarbonyl group), an unsubstituted alkyl group having 1 to 18 carbon atoms, preferably 1 to 10 carbon atoms, and more preferably 1 to 5 carbon atoms (such as a methyl group, an ethyl group, a propyl group, or a butyl group), a substituted alkyl group having 1 to 18 carbon atoms, preferably 1 to 10 carbon atoms, and more preferably 1 to 5 carbon atoms (such as a hydroxymethyl group, a trifluoromethyl group, a benzyl group, a carboxyethyl group, an ethoxycarbonylmethyl group, or an acetylaminomethyl group, provided that the substituted alkyl group includes an unsaturated hydrocarbon group having 2 to 18 carbon atoms, preferably 3 to 10 carbon atom, and more preferably 3 to 5 carbon atoms (such as a vinyl group, an ethynyl group, a 1-cyclohexenyl group, a benzylidine group, or a benzylidene group)), a substituted or unsubstituted aryl group having 6 to 20 carbon atoms, preferably 6 to 15 carbon atoms, and more preferably 6 to 10 carbon atoms (such as a phenyl group, a naphthyl group, a p-carboxyphenyl group, a p-nitrophenyl group, a 3,5-dichlorophenyl group, a p-cyanophenyl group, an m-fluorophenyl group, a p-tolyl group, a 4-propylcyclohexyl-4'-biphenyl group, a 4-butylcyclohexyl-4'-biphenyl group, a 4-pentylcyclohexyl-4'-biphenyl group, or a 4-propylphenyl-2-ethynyl-4'-biphenyl group), a substituted or unsubstituted heteroaryl group having 1 to 20 carbon atoms, preferably 2 to 10 carbon atoms, and more preferably 4 to 6 carbon atoms (such as a pyridyl group, a 5-methylpyridyl group, a thienyl group, a furyl group, a morpholino group, or a tetrahydrofurfuryl group).

Those substituent groups V may have a structure in which a benzene ring or a naphthalene ring is fused. Further, the substituent illustrated by the explanation for the substituent groups V explained so far may further be substituted on the substituents described above.

Among the groups in the substituent groups V, preferable examples of the substituents for the bivalent arylene group, the bivalent heteroarylene group and the bivalent alicyclic hydrocarbon group each represented by $D^1$ or $D^2$ are an alkyl group, an alkoxy group, a halogen atom, and a cyano group.

In the Formula (1), $L^1$ represents a bivalent connecting group. Examples of the bivalent connecting group preferably include an alkanediyl group, alkenylene group, alkynylene group, ether group, ester group, carbonyl group, azo group, azoxy group, and alkyleneoxy group, and more preferably include an alkanediyl group (such as ethylene group), an alkynylene group (such as ethynylene group), and an ester group.

In the Formula (1), $T^1$ represents an alkyl group, an alkoxy group, an alkoxycarbonyl group, an acyloxy group, a halogen atom, or a cyano group.

Preferable examples of $T^1$ include: an alkyl group having 1 to 30 carbon atoms, more preferably 3 to 20 carbon atoms, and more preferably 3 to 10 carbon atoms (such as an n-propyl group, an n-butyl group, an n-pentyl group, or an n-hexyl group); an alkoxy group having 1 to 30 carbon atoms, more preferably 3 to 20 carbon atoms, and more preferably 3 to 10 carbon atoms (such as an n-propyloxy group, an n-butoxy group, an n-pentyloxy group, or an n-hexyloxy group); an alkoxycarbonyl group having 1 to 30 carbon atoms, more preferably 3 to 20 carbon atoms, and more preferably 3 to 10 carbon atoms (such as an n-propyloxycarbonyl group, an n-butoxycarbonyl group, an n-pentyloxycarbonyl group, or an n-hexyloxycarbonyl group); an acyloxy group having 1 to 30 carbon atoms, more preferably 3 to 20 carbon atoms, and more preferably 3 to 10 carbon atoms (such as an acetyloxy group, a propionyloxy group, or a hexanoyloxy group); and a halogen atom (such as a fluorine atom or a chlorine atom).

The alkyl group, alkoxy group, alkoxycarbonyl group, or acyloxy group represented by $T^1$ in the Formula (1) may be substituted or unsubstituted, and the substituent may be those of the substituent groups V.

The substituent for the alkyl group, alkoxy group, alkoxycarbonyl group, or acyloxy group represented by $T^1$ is preferably a halogen atom (particularly a chlorine atom or a fluorine atom), a cyano group, a hydroxy group, an alkoxy group, or an acyl group among the substituent groups V.

In Formula (1), s represents 0 or 1.

In Formula (1), e represents an integer from 1 to 3, and preferably represents 1 or 2. When e represents 2 or 3, a plurality of $D^1$ may be the same as or different from each other.

In Formula (1), m represents an integer from 1 to 3, and preferably represents 1 or 2. When m represents 2 or 3, a plurality of $D^1$ may be the same as or different from each other, and a plurality of $L^1$ may be the same as or different from each other.

In Formula (1), k represents 1 or 2. When k is 2, a plurality of $D^2$ may be the same as or different from each other.

In Formula (1), f represents an integer from 0 to 3, and preferably represents 0 to 2. When f is 2 or 3, a plurality of $L^1$ represent connecting groups different from each other.

In Formula (1), the total number of the groups represented by $D^1$ and $D^2$, or e×m+k is an integer from 2 to 5, and more preferably an integer from 2 to 3. When each of e and k is 2 or more, 2 or more $D^1$ and $D^2$ may be the same as or different from each other respectively, and when m is 2 or more, 2 or more $((D^1)_e\text{-}(L^1)_f)$ may be the same as or different from each other.

Particularly preferred are the following combinations of e, f, m, and k.

(I) e=1, f=1, m=2, and k=1
(II) e=2, f=1, m=1, and k=1
(III) e=1, f=1, m=1, and k=2
(IV) e=1, f=0 m=2, and k=1
(V) e=1, f=0, m=1, and k=1

When $D^2$ connected to $T^1$ is one of the specific cyclohexane rings, $T^1$ is preferably an alkyl group, more preferably an alkyl group having 1 to 20 carbon atoms, further more preferably an alkyl group having 3 to 12 carbon atoms, and particularly preferably an alkyl group having 3 to 10 carbon atoms. In addition, when $D^2$ connected to $T^1$ is one of the specific cyclohexane rings, $T^1$ is preferably connected to the position 1 or 4 of the ring of $D^2$.

More specifically, when $D^2$ connected to $T^1$ is one of the specific cyclohexane rings, the substituent expressed by the Formula (1) preferably has the following structural formula.

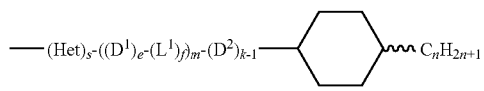

In the structural formula, Het, $D^1$, $D^2$, $L^1$, $T^1$, s, e, m, and f are equivalent to Het, $D^1$, $D^2$, $L^1$, $T^1$, s, e, m and f in the Formula (1), and their preferable ranges are the same. k−1 represents 0 or 1. n represents 1 to 20, preferably represents 3 to 12, and more preferably represents 3 to 10.

Specific examples of the substituent represented by the Formula (1) are shown hereinafter, but the invention is not limited to these. In the following formulae, * indicates a connecting position with the dye matrix.

(1)
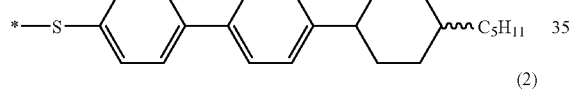

(2)
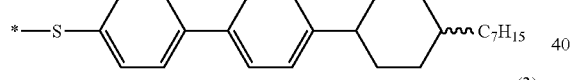

(3)
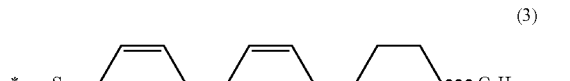

(4)
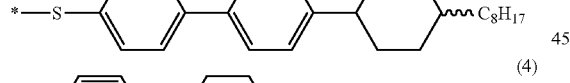

(5)
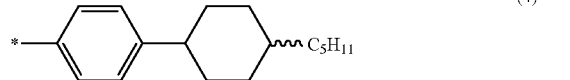

(6)
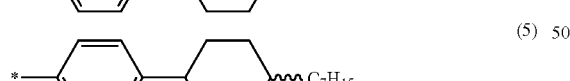

(7)
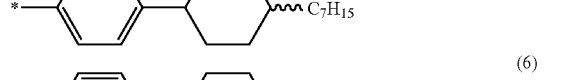

(8)
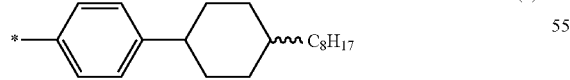

-continued (9)
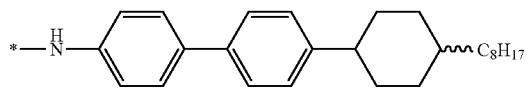

(10)
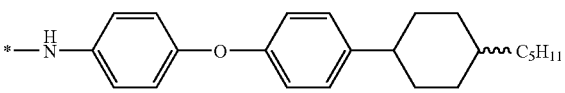

(11)
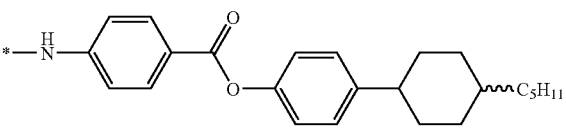

(12)
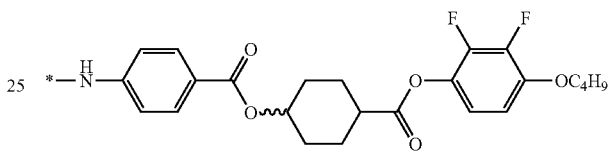

(13)
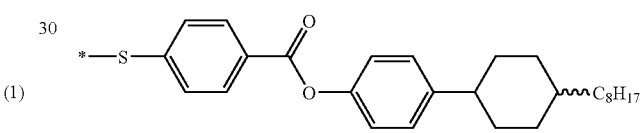

(14)
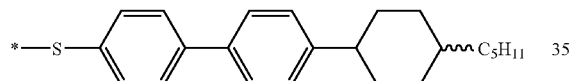

(15)
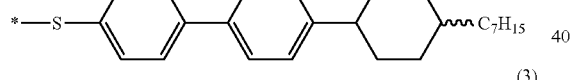

(16)
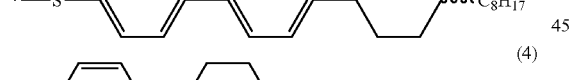

(17)
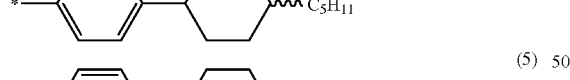

(18)
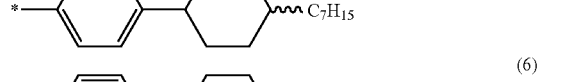

-continued

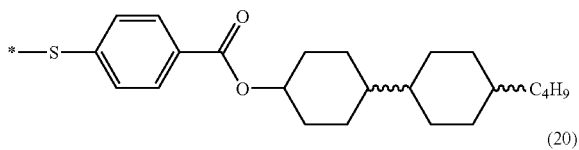

(19)

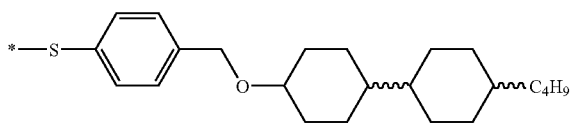

(20)

There are various methods of synthesizing a substituent including a cis-cyclohexane ring or a substituent including a trans-cyclohexane ring. In the invention, cyclohexyl alcohol produced through the reaction between cyclohexanone and a Grignard reagent is dehydrated to synthesize cyclohexene, and the cyclohexene is reduced by hydrogenation thereby obtaining the target substance. The target substance obtained through the reaction is subjected to column purification without being subjected to purification such as recrystallization to give a substituent intermediate and a substituent precursor in which the cis- or trans-cyclohexane ring is present.

The ratio of the number of cis-cyclohexane rings to the number of trans-cyclohexane rings included in the plurality of dichroic dyes of the invention can be changed by adding a single dichroic dye having a substituent having the trans-cyclohexane ring or a single dichroic dye having a substituent having the cis-cyclohexane ring to the plurality of dichroic dyes.

The ratio of the number of cis-cyclohexane rings to the number of trans-cyclohexane rings included in the plurality of dichroic dyes of the invention can be confirmed by $^1$H-NMR and HPLC.

Next, description is given of the plurality of dichroic dyes of the invention composed of a dichroic dye having a substituent containing a cis-cyclohexane ring and a dichroic dye having a substituent containing a trans-cyclohexane ring.

The dichroic dye is defined as a compound which dissolves in a host liquid crystal, and has a function of absorbing light. The plurality of dichroic dyes of the invention are not particularly limited as to absorption maximum and absorption band. However, the plurality of dichroic dyes of the invention preferably have an absorption maximum in a yellow (Y), magenta (M), or cyan (C) region. The plurality of dichroic dyes included in the liquid crystal element of the invention may be used alone, or in combination with other dye mixtures. In a case where a plurality of dye mixtures are mixed, a plurality of the dichroic dyes of the invention may be mixed, or the dichroic dyes of the invention may be mixed with other known dichroic dyes. It is preferable to use a plurality of dichroic dyes having an absorption maximum in the Y, M, or C region. Well known dichroic dyes include, for example, those described in "Diachronic Dyes for Liquid Crystal Display", written by A. V. Ivashchenko, 1994, published from CRC Corp. A method of conducting full color display by mixing a yellow dye, a magenta dye, and a cyan dye is described in detail in "Color Chemistry", (written by Sumio Tokida, 1982, published from Maruzen). The yellow region herein is a range of 430 to 490 nm, the magenta region is a range of 500 to 580 nm, and the cyan region is a range of 600 to 700 nm.

Next, the chromophoric group used in the dichroic dye of the present invention will be explained.

Any chromophoric group may be used for the dichroic dye. Examples thereof include azo dyes, anthraquinone dyes, perylene dyes, merocyanine dyes, azomethine dyes, phthaloperylene dyes, indigo dyes, azulene dyes, dioxadine dyes, polythiophene dyes, and phenoxazine dyes. Preferred are azo dyes, anthraquinone dies, phenoxazine dyes, and particularly preferred are anthraquinone dyes, and phenoxazone dyes (phenoxazin-3-one).

The azo dyes may be any of monoazo dyes, bisazo dyes, trisazo dyes, tetrakisazo dyes, and pentakisazo dyes, and preferred are monoazo dyes, bisazo dyes, trisazo dyes and the like.

The cyclic structure contained in the azo dye may be heterocyclic rings (quinoline ring, pyridine ring, thiazole ring, benzothiazole ring, oxazole ring, benzooxazole ring, imidazole ring, benzoimidazole ring, pyrimidine ring, etc.) in addition to aromatic groups (benzene ring, naphthalene ring, etc.).

In the anthraquinone dye, the number of the substituents according to the invention is not particularly limited. The number of the substituents according to the invention in the anthraquinone dye is preferably 1 to 6, more preferably 1 to 4, and further more preferably 1 or 2.

The anthraquinone dye may have, in addition to the substituent according to the invention, a substituent preferably containing an oxygen atom, a sulfur atom, or a nitrogen atom. Examples of the substituent include an alkoxy group, an aryloxy group, an alkylthio group, an arylthio group, an alkylamino group, and an arylamino group.

Any number of the substituent (including the substituent according to the invention) may be present on the anthraquinone dye. However, di-substituted, tri-substituted, and tetrakis-substituted structures are preferable. The substituent may be present at any position. However, 1,4-disubstituted, 1,5-disubstituted, 1,8-disubstituted, 2,6-disubstituted, 2,7-disubstituted, 1,4,5-trisubstituted, 1,2,4-trisubstituted, 1,2,5-trisubstituted, 1,4,5,8-tetrasubstituted, and 1,2,5,6-tetrasubstituted structures are preferable.

In the phenoxazone dye (phenoxazin-3-one), the number of the substituents according to the invention is not particularly limited. The phenoxazone dye preferably has 1 to 4, more preferably 1 to 3, and more preferably 1 or 2 substituents according to the invention.

The phenoxazone dye may have, in addition to the substituent according to the invention, a substituent preferably containing an oxygen atom, a sulfur atom, or a nitrogen atom. Examples of the substituent include an alkoxy group, an aryloxy group, an alkylthio group, an arylthio group, an alkylamino group, and an arylamino group.

Any number of substituent (including the substituent according to the invention) may be present on the phenoxazone dye. However, di-substituted, tri-substituted, tetrakis-substituted structures are preferable. The substituent may be present on any position. However, 2,7-disubstituted, 1,2,7-trisubstituted, 2,7,8-trisubstituted, 2,7,9-trisubstituted, 1,2,7,8-tetrasubstituted, and 1,2,7,9-tetrasubstituted structures are preferable.

Liquid Crystal Composition

The liquid crystal composition of the invention includes at least the plurality of dichroic dyes and a liquid crystal compound. The composition may contain other additives with the aim of changing the physical properties of the host liquid crystal.

Host Liquid Crystal

The dichroic dye is dissolved in the host liquid crystal by means of mechanical stirring, heating, application of an ultrasonic wave, or a combination thereof In addition, the liquid crystal composition of the invention can be prepared by any one of well known methods.

The host liquid crystal used in the liquid crystal composition of the invention is not particularly limited as long as it is compatible with the dichroic dyes, and may be a liquid crystal compound exhibiting a nematic or smectic phase.

Specific examples of the compound include an azomethine compound, a cyanobiphenyl compound, a cyanophenyl ester, a fluorine-substituted phenyl ester, a cyclohexanecarboxylic acid phenyl ester, a fluorine-substituted cyclohexanecarboxylic acid phenyl ester, cyanophenyl cyclohexane, fluorine-substituted phenylcyclohexane, cyano-substituted phenylpyrimidine, fluorine-substituted phenylpyrimidine, alkoxy-substituted phenylpyrimidine, fluorine-substituted alkoxy-substituted phenylpyrimidine, phenyldioxane, a tolan compound, a fluorine-substituted tolan compound, and alkenylcyclohexyl benzonitrile. These compounds are described in detail in "Liquid Crystal Device Handbook" edited by Japan Society for the Promotion of Science, the 142th Committee, published by Nikkan Kogyo Shimbun Ltd., 1989, pp. 154 to 192 and pp. 715 to 722).

A fluorine-substituted host liquid crystal suitable for TFT driving can also be used. In addition, a dual frequency addressable liquid crystal can be used as the host liquid crystal.

The ratio of the plurality of dichroic dyes with respect to the host liquid crystal in the liquid crystal composition of the invention is optional because the absorbance coefficient varies depending on the dye, but is preferably 0.1 to 15% by mass, more preferably 0.5 to 8% by mass, and particularly preferably 1 to 5% by mass with respect to the host liquid crystal in the liquid crystal composition of the invention.

Additives

The liquid crystal composition of the invention may have added thereto a compound having no liquid crystal property with the aim of changing the physical properties of the host liquid crystal (for example, the temperature range of the liquid crystal phase). The composition may also contain other additives such as a chiral compound, an ultraviolet absorbent, or an antioxidant. Examples of the additives include the chiral reagents for twisted nematic (TN) and super-twisted nematic (STN) liquid crystal devices described in "Liquid Crystal Device Handbook" edited by Japan Society for the Promotion of Science, the 142th Committee, published by Nikkan Kogyo Shimbun Ltd., 1989, pp. 199 to 202.

Liquid Crystal Element

The liquid crystal element of the invention has at least a liquid crystal layer between a pair of electrodes at least one of which is a transparent electrode, and includes a liquid crystal composition in the liquid crystal layer.

The liquid crystal element of the invention can be produced in such a manner that a liquid crystal layer is interposed between a pair of electrode substrates. An electrode substrate used in the liquid crystal element of the invention is usually a glass or plastic substrate, and a plastic substrate is preferable. Examples of the material for the plastic substrate used in the invention include an acrylic resin, a polycarbonate resin, and an epoxy resin. Specific examples of the material include triacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin, and polyimide (PI). A preferable polymer is polyethylene terephthalate (PET).

While the thickness of the plastic substrate is not particularly limited, it is preferably from 30 μm to 700 μm, more preferably from 40 μm to 200 μm, and further preferably 50 μm to 150 μm. In any of the cases, haze is preferably 3% or less, more preferably 2% or less, and further preferably 1% or less, and the total transmittance is preferably 70% or more, more preferably 80% or more, and further preferably 90% or more.

The plastic substrate may contain resin property-reforming agents, such as a plasticizer, a dye, a pigment, an antistatic agent, an ultraviolet absorbent, an antioxidant, inorganic fine particles, a separation promoting agent, a leveling agent, or a lubricant, as occasion demands, unless the effects of the invention is impaired.

The plastic substrate may be either light permeable or light impermeable. In a case of using light impermeable support as the support, a white support having light reflectivity can be used. Examples of the white support include a plastic substrate with addition of inorganic pigments such as titanium oxide or zinc oxide. In a case where the support serves as a display surface, it is necessary that the support has permeability to at least light in a visible region.

The substrate is described specifically, for example, in "Liquid Crystal Device Handbook" edited by Japan Society for the Promotion of Science, the 142nd Committee, published by Nikkan Kogyo Shimbun Ltd., 1989, pp. 218 to 231.

An electrode layer, preferably a transparent electrode layer, is formed on the surface of at least one of the pair of substrates. For the electrode layer, indium oxide, indium thin oxide (ITO), tin oxide, and the like are used. For the transparent electrode, those described, for example, in "Liquid Crystal Device Handbook" edited by Japan Society for the Promotion of Science, the 142nd Committee, published by Nikkan Kogyo Shimbun Ltd., 1989, pp. 232 to 239 are used. The transparent electrode can be formed by a sputtering method, sol-gel method or printing method.

With an aim of orienting the liquid crystal in the liquid crystal element of the invention, a layer applied with an orientation treatment may be formed to the surface where the liquid crystal and substrate are in contact with each other. The orientation treatment includes, for example, a method of orientation by coating a quaternary ammonium salt, a method of orientation by coating polyimide and applying a rubbing treatment, a method of orientation by vapor depositing $SiO_x$ in the oblique direction, and further, a method of orientation by photo-irradiation utilizing photo-isomerization. For the oriented film, those described, for example, in "Liquid Crystal Device Handbook" edited by Japan Society for the Promotion of Science, the 142nd Committee, published by Nikkan Kogyo Shimbun Ltd., 1989, pp. 240 to 256 are used.

The liquid crystal element of the invention can be produced by injecting the liquid crystal composition into a space between a pair of substrates, which is disposed with an interval of 1 to 50 μm via a spacer or the like. The spacer is described, for example, on pages 257 to 262 of "Liquid Crystal Device Handbook", edited by the 142nd Committee of Japan Society for the Promotion of Science, Nikkan Kogyo Shimbun Ltd., 1989. The liquid crystal composition of the invention can be disposed in the space between the substrates by applying or printing the liquid crystal composition on the substrate.

The liquid crystal element of the invention may also have a white reflector, an antireflection film, a brightness enhancement film, or the like.

The liquid crystal element of the invention can be driven by a simple matrix driving system or an active matrix driving system using a thin-film transistor (TFT) or the like. The driving system may be, for example, those described in "Liquid Crystal Device Handbook" edited by Japan Society for the Promotion of Science, the 142th Committee, published by Nikkan Kogyo Shimbun Ltd., 1989, pp. 387 to 460).

The liquid crystal element including the liquid crystal composition of the invention may be of any system. Examples of the system include those described in "Liquid Crystal Device Handbook" edited by Japan Society for the Promotion of Science, the 142th Committee, published by Nikkan Kogyo Shimbun Ltd., 1989, p. 309, such as (1) homogeneous orientation and (2) homeotropic orientation, both of which are classified as guest-host type; and (3) focalconic orientation and (4) homeotropic orientation, both of which are classified as White-Taylor type (phase transition); (5) combination with super-twisted nematic (STN) liquid crystal; and (6) combination with ferroelectric liquid crystal (FLC). Other examples include those described in "General Technologies of Reflection-type Color LCD", supervised by Tatsuo Uchida, published by CMC Publishing Co. Ltd., 1999, Chapter 2-1 (GH-mode Reflective mode Color LCD), pp. 15-16, such as (1) Heilmeier type GH mode, (2) quarter-wave plate GH mode, (3) two-layer type GH mode, (4) phase transition GH mode, and (5) polymer-dispersed liquid crystal (PDLC) GH mode.

The liquid crystal element of the invention is applicable to a multi-layered GH mode described in JP-A No. 10-67990, JP-A No. 10-239702, JP-A No. 10-133223, JP-A No. 10-339881, JP-A No. 11-52411, JP-A No. 11-64880, JP-A No. 2000-221538, and the like and a GH mode using microcapsules described in JP-A No. 11-24090 and the like. The liquid crystal element of the invention is also applicable to reflection type liquid crystal displays described in JP-A Nos. 6-235931, 6-235940, 6-265859, 7-56174, 9-146124, 9-197388, 10-20346, 10-31207, 10-31216, 10-31231, 10-31232, 10-31233, 10-31234, 10-82986, 10-90674, 10-111513, 10-111523, 10-123509, 10-123510, 10-206851, 10-253993, 10-268300, 11-149252, 2000-2874, and the like, and a polymer-dispersed liquid crystal GH mode described in JP-A No. 5-61025, 5-265053, 6-3691, 6-23061, 5-203940, 6-242423, 6-289376, 8-278490, and 9-813174.

The liquid crystal composition of the invention is also useful as an optical element described below. Specific examples of the optical element according to the invention include: functional films such as circularly polarized light-emitting films, optical films, retardation films, ferroelectric films, antiferroelectric films, and piezoelectric films; and functional elements such as (circularly) polarized light-emitting elements, optically-pumped or electric field-pumped laser oscillation elements (based on a primary photonic crystal effect), LCD backlights, non-linear optical elements, electro-optical elements, pyroelectric elements, piezoelectric elements, and light modulation elements. The optical element of the invention can be produced by, for example, (1) applying the compound (or composition) of the invention to a support or a pair of supports (e.g., celluloid), and then crosslinking the coated compound (or composition), or (2) injecting the compound (or composition) of the invention as it is.

EXAMPLES

Hereinafter, the present invention is described in more detail with reference to the following examples. The following examples are for illustration of the invention only and do not limit the scope of the invention.

Example 1

Synthesis of Substituent (3)

A substituent (3) was synthesized in accordance with the following scheme.

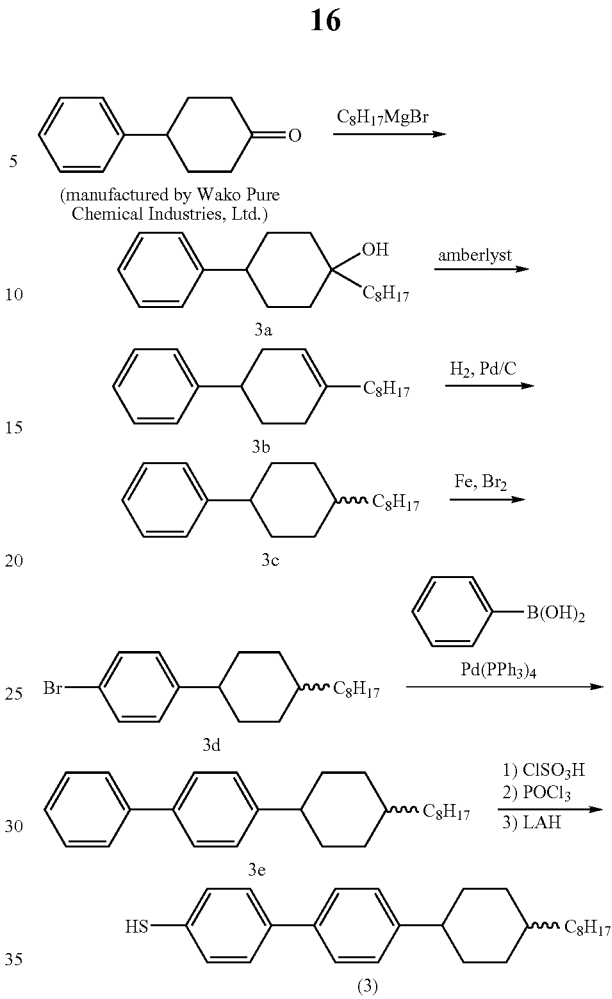

Synthesis of Compound 3a

To 600 ml of a THF solution containing 62.3 g of anhydrous cerium chloride, 250 ml of a 1M THF solution of n-octyl Grignard reagent was added dropwise under cooling with ice, and the mixture was stirred for 30 minutes. Subsequently, 29.4 g of phenylcyclohexanone (manufactured by Wako Pure Chemical Industries, Ltd.) was added to the mixture, and stirred for 2 hours. The reaction solution was added dropwise to a mixture of 100 ml of acetic acid and 1 L of water, stirred, and then subjected to extraction with ethyl acetate. The organic layer was washed with sodium bicarbonate water and then with saturated salt water, dried with magnesium sulfate, and then concentrated under reduced pressure. The concentration residue was purified by means of alumina column chromatography, to thereby produce 46 g of compound 3a.

Synthesis of Compound 3b 400 ml of a toluene reaction solution containing 46 g of the compound 3a and 3 g of AMBERLIST (trade name, manufactured by ICN Biomedicals) was placed in a reaction vessel equipped with a Dean-Stark trap and a Dimroth condenser. The reaction solution was heated in an oil bath for 4 hours under reflux. The reaction solution was water-cooled, and then subjected to filtration. The obtained toluene solution was concentrated under reduced pressure. The concentration residue was purified by means of silica gel chromatography, to thereby produce 42 g of compound 3b.

Synthesis of Compound 3c

An isopropyl alcohol reaction solution containing 42 g of the compound 3b and 4 g of 5% Pd/C was placed in an autoclave, and stirred for 3 hours in an $H_2$ gas atmosphere at 50° C., 5 MPa. The reaction solution was subjected to celite filtration, and concentrated under reduced pressure. The concentration residue was purified by means of silica gel chromatography (developing solution: n-hexane) to give 42 g of compound 3c containing cis- and trans-cyclohexane rings (cis:trans ratio of 3:7). In order to increase the cis ratio, the filtrate obtained after adding n-hexane, stirring, and filtration was concentrated to give compound 3c having a cis:trans ratio of 1:1. The crystal collected by filtration was compound 3c composed exclusively of trans isomers.

Synthesis of Compound 3d 2.7 ml of bromine was added to a reaction solution containing 12 mg of reduced iron and 5 ml of n-hexane. The solution was stirred for 5 minutes under cooling with ice, and 10 ml of an n-hexane solution containing 13 g of the compound 3c was added dropwise thereto. The mixture was stirred for an additional 5 minutes. To the reaction solution, water and an aqueous solution of sodium thiosulfate were added in this order. The mixture was subjected to extraction with ethyl acetate, and then concentrated under reduced pressure. The concentration residue was purified by means of silica gel chromatography (developing solution: n-hexane), to thereby produce 14 g of compound 3d.

Synthesis of Compound 3e 50 ml of toluene had added thereto 5 g of the compound 3d, 2 g of phenylboronic acid, 0.19 g of tetrakis(triphenylphosphine) palladium and 22 g of potassium carbonate. The mixture had added thereto 25 ml of water to prepare a reaction solution. The reaction solution was stirred at 90° C. for 3 hours under a nitrogen atmosphere. The aqueous layer was removed. The organic layer was washed with 1N aqueous hydrochloric acid, dried with magnesium sulfate, and then concentrated under reduced pressure. The concentration residue was purified by means of silica gel chromatography (developing solution: n-hexane), to thereby produce 4.0 g of compound 3e.

Synthesis of Substituent (3)

1.5 ml of chlorosulfonic acid was added dropwise to 35 ml of a chloroform solution containing 3.5 g of the compound 3e under cooling with ice, and stirred for 1 hour. To the reaction solution, 7 ml of DMAc and 2.8 ml of phosphorus oxychloride were added dropwise, and stirred at 50° C. for 2 hours. To the solution, 9 ml of water and 1.7 ml of sulfuric acid were added dropwise. The reaction solution was subjected to filtration, and then washed with water and methanol to give a chlorosulfonated derivative. To 20 ml of a 1M THF solution of LAH, 15 ml of a THF solution containing 3.4 g of the chlorosulfonated derivative was added dropwise under cooling with ice, and the mixture was stirred at 50° C. for 2 hours. The reaction solution was added to 1N aqueous hydrochloric acid, and subjected to extraction with ethyl acetate. The organic layer was dried with magnesium sulfate, and then concentrated under reduced pressure. The concentration residue was purified by means of silica gel chromatography (developing solution: n-hexane), to thereby produce 1.9 g of a substituent (3). The compound was identified by elementary analysis, NMR, and mass spectroscopy. The compound was a white or pale yellow solid.

Synthesis of Dye 1 of the Invention

Dye 1 of the invention having the substituent (3) was synthesized under the following scheme according to the method described in Chemische Berichte, 52, 555 (1919), Bull. Chem. Soc. Japan, 64, 11, 3417-3421 (1991) and Japanese National Phase Publication (Laid-Open) No. 2004-537639.

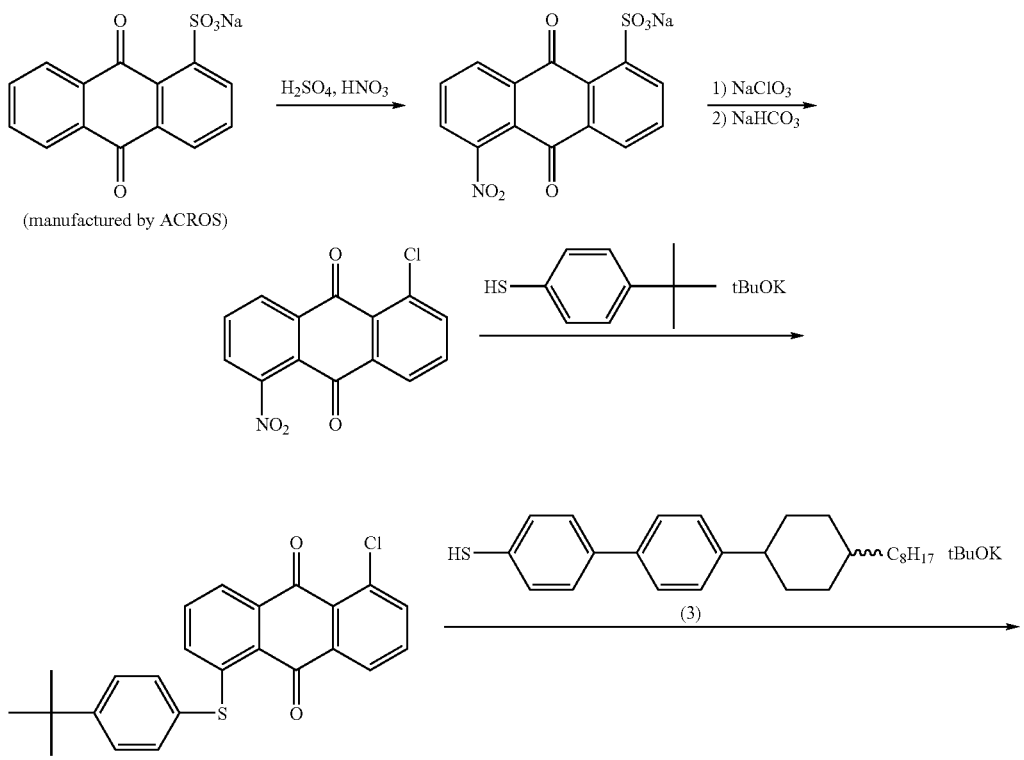

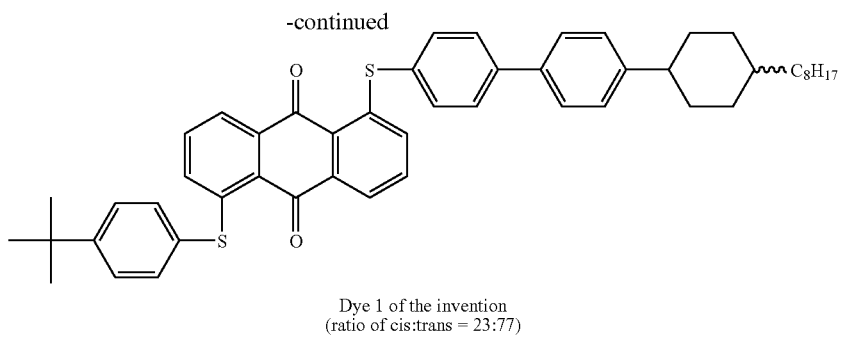

Dye 1 of the invention
(ratio of cis:trans = 23:77)

The ratio of the cis-cyclohexane ring to the trans-cyclohexane ring in dye 1 of the invention was determined by $^1$H-NMR.

Synthesis of Dye 2 of the Invention Having Substituent (6)

The dye 2 of the invention was synthesized in accordance with the following scheme.

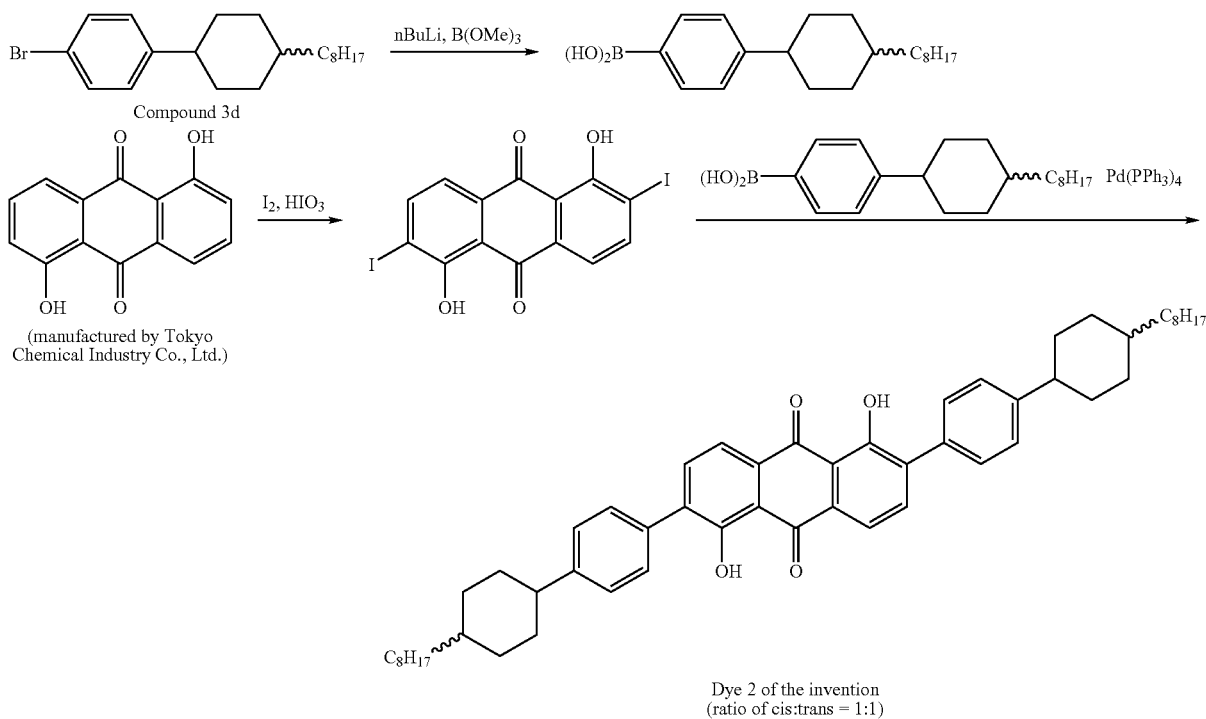

Dye 2 of the invention
(ratio of cis:trans = 1:1)

In the substituent according to the invention, a single isomer of trans-cyclohexane was added to dye 2 of the invention (the mixture having a cis:trans ratio of 1:1), to thereby produce dyes 3 to 5 of the invention having different cis/trans ratios.

TABLE 1

| Dye | Ratio of cis:trans |
| --- | --- |
| Dye 3 of the invention | 40:60 |
| Dye 4 of the invention | 30:70 |
| Dye 5 of the invention | 20:80 |

Example 2

In 100 mg of a host liquid crystal ZLI-2806 (trade name, manufactured by E. Merck) or 100 mg of MLC-6609 (trade name, manufactured by E. Merck), 1 mg and 5 mg of each of dyes 1 to 5 of the invention and the following comparative dyes 1 to 3 were respectively dissolved to prepare liquid crystal compositions.

Each of the liquid crystal composition was injected into a liquid crystal cell (manufactured by E.H.C.) to prepare an evaluation cell. The liquid crystal cell was composed of 0.7 mm glass plates provided with an ITO transparent electrode and an oriented polyimide film which had been horizontally oriented by rubbing treatment, in which the cell gap was 8 μm, and the glass plates were sealed with an epoxy resin.

The cell was irradiated with polarized light parallel or perpendicular to the rubbing direction, and the absorption spectrum (A∥ or A⊥) in each case was measured by the UV-VIS spectrometer UV2400PC (manufactured by Shimadzu Co., Ltd.). From the A∥ and A⊥ at the maximum absorption wavelength, the order parameter S was calculated according to the following Equation 2.

$$S=(A\|-A\bot)/(A\|+2\cdot A\bot) \quad \text{Equation 2}$$

After aging the liquid crystal composition for one week, another set of liquid crystal cells were prepared in the same manner. Each of the cells was irradiated with polarized light parallel or perpendicular to the rubbing direction, and the absorption spectrum (A∥ or A⊥) in each case was measured by the UV-VIS spectrometer UV2400PC (described above). From the A∥ and A⊥ at the maximum absorption wavelength of the completely dissolved dye, the dye concentration dissolved in the host liquid crystal was determined in terms of solubility. The absorption when the dye was completely dissolved was measured using a liquid crystal composition containing 1 mg of the dye. When the dye was not completely dissolved, the amount of the dye was decreased until it completely dissolved, and the sample was used for the measurement of the absorption.

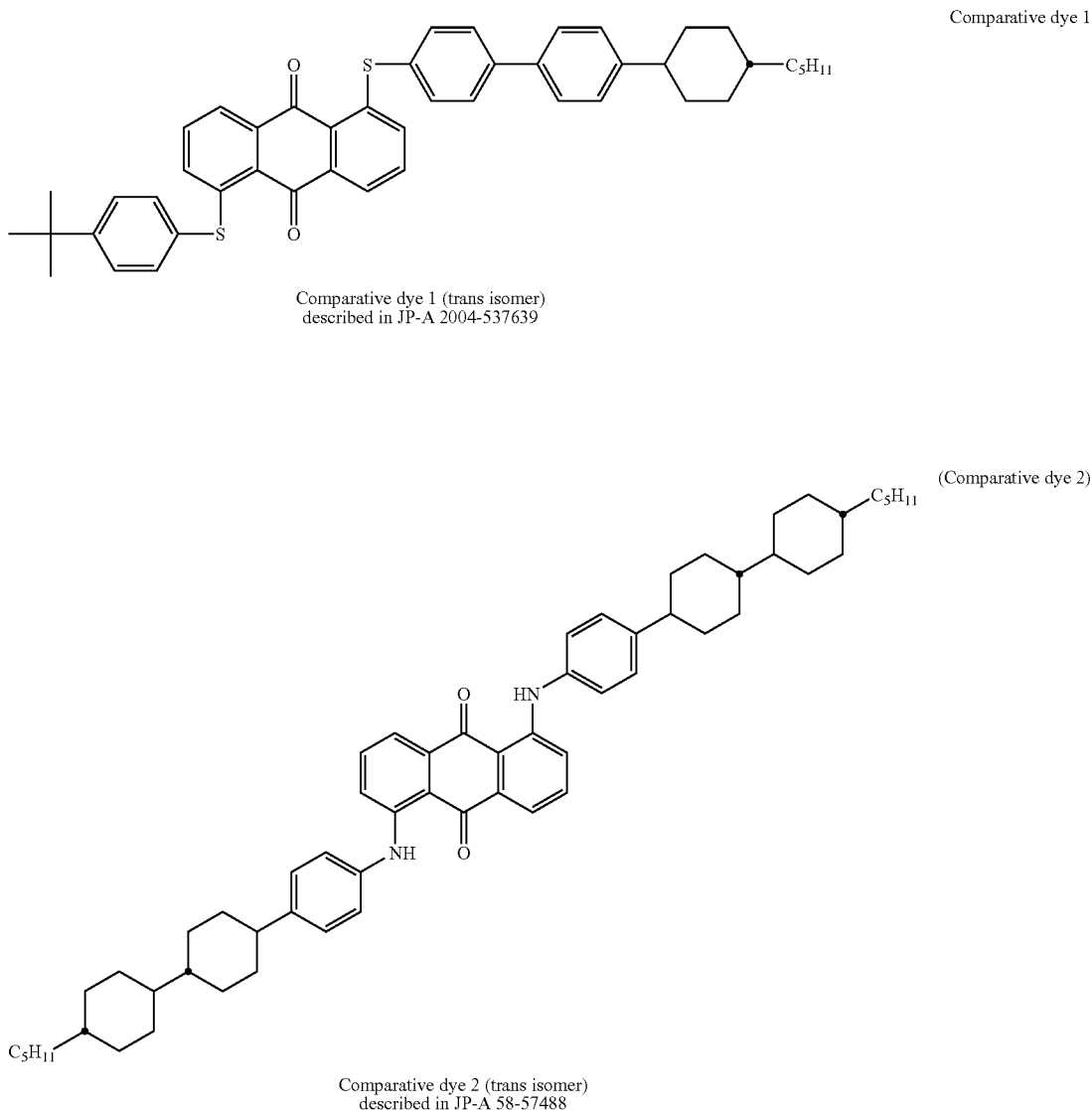

Comparative dye 1

Comparative dye 1 (trans isomer)
described in JP-A 2004-537639

(Comparative dye 2)

Comparative dye 2 (trans isomer)
described in JP-A 58-57488

-continued

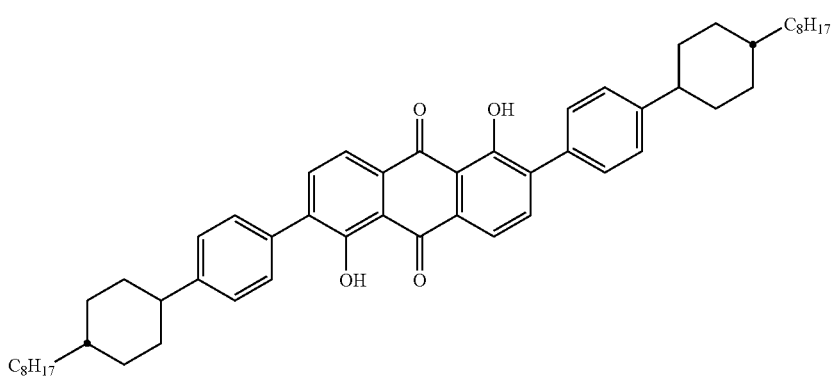

Comparative dye 3

Comparative dye 3 (trans isomer)

The measurement results in Example 2 are shown in Table 2. The absorbance herein represents the absorption A∥ measured when the cell was irradiated with polarized light parallel to the rubbing direction.

TABLE 2

| Dye | Host liquid crystal | Order parameter | Solubility |
|---|---|---|---|
| Dye 1 of the invention | ZLI-2806 | 0.81 | 2.9% by mass |
| Comparative dye 1 | ZLI-2806 | 0.81 | 0.8% by mass |
| Comparative dye 2 | ZLI-2806 | 0.77 | 1.5% by mass |
| Dye 2 of the invention | ZLI-2806 | 0.79 | 3.5% by mass |
| Comparative dye 3 | ZLI-2806 | 0.81 | 0.1% by mass |
| Dye 3 of the invention | ZLI-2806 | 0.79 | 3.2% by mass |
| Dye 4 of the invention | ZLI-2806 | 0.80 | 3.0% by mass |
| Dye 5 of the invention | ZLI-2806 | 0.80 | 2.8% by mass |
| Dye 1 of the invention | MCL-6609 | 0.80 | 2.8% by mass |
| Comparative dye 1 | MCL-6609 | 0.78 | 1.1% by mass |
| Comparative dye 2 | MCL-6609 | 0.79 | 1.3% by mass |
| Dye 2 of the invention | MCL-6609 | 0.80 | 3.8% by mass |
| Comparative dye 3 | MCL-6609 | 0.82 | 0.1% by mass |
| Dye 3 of the invention | MCL-6609 | 0.80 | 3.6% by mass |
| Dye 4 of the invention | MCL-6609 | 0.81 | 3.4% by mass |
| Dye 5 of the invention | MCL-6609 | 0.81 | 3.2% by mass |

As is evident from Table 2, the plurality of dichroic dyes of the invention which contain a dichroic dye having a cis substituent and another dichroic dye having a trans substituent exhibited high solubility while high order parameters were maintained, in comparison with the comparative dyes composed exclusively of trans isomers.

According to the results, the preferable ratios of the number of the cis-cyclohexane rings to the number of the trans-cyclohexane rings included in the plurality of dichroic dyes of the invention are summarized as shown below from the viewpoints of order parameter and solubility in a liquid crystal. The best is A, followed by B, B−, and C, in this order.

TABLE 3

| Cis:trans ratio | Result |
|---|---|
| 1:99-4:96 | C |
| 5:95-10:90 | B− |
| 11:89-19:81 | B |
| 20:80-50:50 | A |
| 51:49-74:26 | B |
| 75:25-99:1 | C |

Example 3

Preparation of Liquid Crystal Element

1. Preparation of Liquid Crystal Element

A perpendicularly oriented polyimide film (manufactured by Nissan Chemical Industries, Ltd.) was provided by spin coating and sintering on each of glass substrates each having an ITO transparent electrode. 30 mg of dye 2 of the invention as a dichroic dye and 2.93 mg of a chiral reagent R-1011 (trade name, manufactured by Merck) were dissolved in 1.0 g of a host liquid crystal ZLI-2806 (described above) under heating, and then aged for one day at room temperature.

The obtained liquid crystal composition was mixed with a small amount of a 20-μm spherical spacer (manufactured by Sekisui Chemical Co., Ltd.), and the mixture was sandwiched between the ITO-coated glass substrates so that the oriented films came into contact with the liquid crystal layer, and sealed with a photocurable sealing agent (manufactured by Sekisui Chemical Co., Ltd.).

2. Evaluation

The obtained liquid crystal element of the invention was colorless and transparent under application of no voltage. The liquid crystal layer was colored when a voltage (20 V, 60 Hz) was applied using a signal generator (manufactured by Tektronix, Inc.). The UV/vis absorption spectra in the colored state and the colorless transparent state were measured using UV2400 at the maximum absorption wavelength of the dichroic dye to determine the transmittance in the colored state and the colorless transparent state. It was found that the transmittance was 5% in the colored state, and 60% in the colorless transparent state. The ratio of the transmittance in the colored state to that in the transparent state (T(transparent)/T(colored)) was 12, which indicates that the liquid crystal element of the invention exhibits a high contrast ratio, and thus is suitable for light modulating materials and electronic paper.

Example 4

Preparation of Liquid Crystal Element 2

1. Preparation of Plastic Substrate

In the same manner as the preparation of sample 110 of Example 1 described in JP-A No. 2000-105445, PEN: Dupont-Teijin Q65A (trade name, manufactured by Dupont- Teijin) was provided with an undercoat layer and a back layer. More specifically, 100 parts by weight of polyethylene-2,6-naphthalate polymer and 2 parts by weight of an ultraviolet absorbent Tinuvin P. 326 (trade name, manufactured by Ciba-Geigy) were dried, and then melted at 300° C. The melted product was extruded from a T-die, longitudinally stretched 3.3 times at 140° C., and then laterally stretched 3.3 times at 130° C. The resultant product was subjected to heat-set at 250° C. for 6 seconds, to thereby produce a plastic (PEN) substrate of the invention having a thickness of 90 µm.

2. Preparation of Transparent Electrode Layer

Conductive indium tin oxide (ITO) was applied to one surface of the above-described plastic substrate to form a uniform thin film having a thickness of 200 nm. The surface resistance was about 20 $\Omega/cm^3$, and the light transmittance (500 nm) was 85%. Subsequently, a $SiO_2$ thin film (100 nm) as an antireflective film was provided by sputtering on the ITO surface. The light transmittance (500 nm) was 90%.

Preparation of Liquid Crystal Layer

On the support, a liquid crystal layer including the liquid crystal composition of Example 3 was formed in the same manner as above.

Formation of Barrier Layer

Formation of Organic-Inorganic Hybrid Layer 8 g of SOARNOL D2908 (trade name, manufactured by Nippon Synthetic Chemical Industry Co., Ltd.: ethylene-vinylalcohol copolymer) was dissolved at 80° C. in a mixed solvent containing 118.8 g of 1-propanol and 73.2 g of water. 10.72 g of the solution was mixed with 2.4 ml of 2N hydrochloric acid. To the solution, 1 g of tetraethoxysilane was added dropwise under stirring, and stirring was continued for 30 minutes. Subsequently, the resultant coating solution was applied with a wire bar onto the support of the liquid crystal element. The coating was dried at 120° C. for 5 minutes to form an organic-inorganic hybrid layer having a thickness of about 1 µm on the liquid crystal element.

Formation of Ultraviolet Absorption Layer 42 g of water, 40 g of silanol-modified polyvinyl alcohol R2105 (trade name, manufactured by Kuraray Co., Ltd.), and 13.5 g of a capsule liquid for UV filters were mixed together. The resultant mixture was further mixed with 17 g of a 50% by mass aqueous solution of 2-(3-t-butyl-5-methyl-2-hydroxyphenyl)-5-chlorobenzotriazole, 65 g of a 20% by mass colloidal silica dispersion liquid (trade name: SNOWTEX 0, manufactured by Nissan Chemical Industries, Ltd.), 2.5 g of polyoxyethylene alkyl ether phosphate (trade name: NEOSCORE CM57, manufactured by Toho Chemical Industry Co., Ltd.), and 2.5 g of polyethyleneglycol dodecyl ether (trade name: EMULGEN 109P, manufactured by Kao Corporation), to thereby produce an ultraviolet filter layer coating solution.

The coating solution was applied with a wire bar onto the above-described barrier layer of a light modulating material. The coating was dried at 120° C. for 5 minutes to form an ultraviolet absorption layer having a thickness of about 1 µm on the liquid crystal element.

Subsequently, a liquid crystal element 2 was prepared in the same manner as in Example 3.

Evaluation of Display Performance

The obtained liquid crystal element of the invention was evaluated in the same manner as in Example 3. The results indicated that the liquid crystal element 2 of the invention exhibits a high contrast ratio, and thus is suitable for light modulating materials and electronic paper.

Example 5

1 mg of Dye 6 of the invention was dissolved in 100 mg of a host liquid crystal XLI-2806 (trade name; manufactured by E. Merck) to thereby prepare a liquid crystal composition. The process was repeated using 5 mg of Dye 6 of the invention and then using 1 mg and then 5 mg of Comparative Dye 3, and these processes were further repeated using 100 mg of MLC-6609 (trade name; manufactured by E. Merck) as the host liquid crystal, to prepare further liquid crystal compositions.

Each of the liquid crystal compositions was injected into a liquid crystal cell (manufactured by E.H.C.) to prepare an evaluation cell. The liquid crystal cell was composed of 0.7 mm glass plates provided with an ITO transparent electrode and an oriented polyimide film which had been horizontally oriented by rubbing treatment, in which the cell gap was 8 µm, and the glass plates were sealed with an epoxy resin.

The order parameter S and solubility of the liquid crystal compositions were determined by the same method as in Example 2.

Dye 6 of the Invention

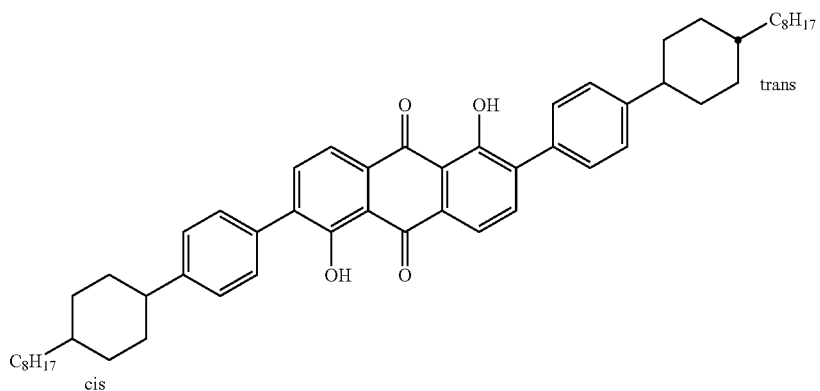

The measurement results are shown in Table 4. Note that, the word "absorption" indicates an absorption A∥ measured when a polarized light beam perpendicular to the rubbing direction was used.

TABLE 4

| Dye | Host liquid crystal | Order parameter | Solubility |
|---|---|---|---|
| Dye 6 of the invention | ZLI-2806 | 0.80 | 3.8 wt % |
| Comparative dye 3 | ZLI-2806 | 0.81 | 0.1 wt % |
| Dye 6 of the invention | MLC-6609 | 0.80 | 3.9 wt % |
| Comparative dye 3 | MLC-6609 | 0.82 | 0.1 wt % |

As shown in Table 4, the dichroic dye of the invention including a cis-cyclohexane ring and a trans-cyclohexane ring in a molecule thereof exhibits high solubility while maintaining high order parameters as compared with the comparative dye including only a trans-cyclohexane ring.

What is claimed is:

1. A dichroic dye comprising at least one of the following (i) and (ii):
   (i) a combination of:
       a first dichroic dye molecule comprising a first substituent, and
       a second dichroic dye molecule comprising a second substituent;
   (ii) a third dichroic dye molecule comprising both of the first substituent and the second substituent,
wherein the first substituent comprises a cis-cyclohexane ring, and
wherein the second substituent comprises a trans-cyclohexane ring.

2. The dichroic dye of claim 1, comprising the (i) combination of the first dichroic dye molecule and the second dichroic dye molecule.

3. The dichroic dye of claim 2, wherein a ratio of the number of the cis-cyclohexane rings included in the dichroic dye to the number of the trans-cyclohexane rings included in the dichroic dye (the number of the cis-cyclohexane rings:the number of the trans-cyclohexane rings) is in a range of from 20:80 to 50:50.

4. The dichroic dye of claim 2, wherein the first substituent and the second substituent are each independently represented by the following Formula (1):

-(Het)$_s$-((D$^1$)$_e$-(L$^1$)$_f$)$_m$-(D$^2$)$_k$-T$^1$      Formula (1)

wherein Het represents an oxygen or sulfur atom; D$^1$ and D$^2$ each independently represent a bivalent arylene group, a bivalent heteroarylene group, or a bivalent alicyclic hydrocarbon group; at least one of D$^1$ and D$^2$ of the first substituent is a cis-cyclohexanediyl group; at least one of D$^1$ and D$^2$ of the second substituent is a trans-cyclohexanediyl group; L$^1$ represents a bivalent connecting group; T$^1$ represents an alkyl group, an alkoxy group, an alkoxycarbonyl group, an acyloxy group, a halogen atom, or a cyano group; s represents 0 or 1; e represents an integer from 1 to 3, wherein a plurality of D$^1$ may be the same as or different from each other when e is 2 or 3; m represents an integer from 1 to 3, wherein a plurality of D$^1$ may be the same as or different from each other when m is 2 or 3; a plurality of L$^1$ may be the same as or different from each other; k is 1 or 2, wherein a plurality of D$^2$ may be the same as or different from each other when k is 2; f represents an integer from 0 to 3, wherein a plurality of L$^1$ represent different connecting groups when f is 2 or 3; the total number of the groups represented by D$^1$ and D$^2$ (e×m+k) is an integer from 2 to 5, wherein a plurality of D$^1$ and D$^2$ may be the same as or different from each other when e and k are each 2 or more, and a plurality of ((D$^1$)$_e$-(L$^1$)$_f$) may be the same as or different from each other when m is 2 or more.

5. The dichroic dye of claim 4, wherein in the first substituent, D$^2$ is a cis-cyclohexanediyl group and T$^1$ is an alkyl group, and wherein in the second substituent, D$^2$ is a trans-cyclohexanediyl group and T$^1$ is an alkyl group.

6. The dichroic dye of claim 5, wherein T$^1$ in the first substituent and T$^1$ in the second substituent each independently represent an alkyl group having 3 to 10 carbon atoms.

7. The dichroic dye of claim 1, comprising the (ii) third dichroic dye molecule comprising both of the first substituent and the second substituent.

8. The dichroic dye of claim 7, wherein a ratio of the number of the cis-cyclohexane rings to the number of the trans-cyclohexane rings included in the dichroic dye (the number of the cis-cyclohexane rings:the number of the trans-cyclohexane rings) is in a range of 20:80 to 50:50.

9. The dichroic dye of claim 7, wherein the first substituent and the second substituent are each independently represented by the following Formula (1):

-(Het)$_s$-((D$^1$)$_e$-(L$^1$)$_f$)$_m$-(D$^2$)$_k$-T$^1$      Formula (1)

wherein Het represents an oxygen or sulfur atom; D$^1$ and D$^2$ each independently represent a bivalent arylene group, a bivalent heteroarylene group, or a bivalent alicyclic hydrocarbon group; at least one of D$^1$ and D$^2$ in the first substituent is a cis-cyclohexanediyl group; at least one of D$^1$ and D$^2$ in the second substituent is a trans-cyclohexanediyl group; L$^1$ represents a bivalent connecting group; T$^1$ represents an alkyl group, an alkoxy group, an alkoxycarbonyl group, an acyloxy group, a halogen atom, or a cyano group; s represents 0 or 1; e represents an integer from 1 to 3, wherein a plurality of D$^1$ may be the same as or different from each other when e is 2 or 3; m represents an integer from 1 to 3, wherein a plurality of D$^1$ may be the same as or different from each other when m is 2 or 3; a plurality of L$^1$ may be the same as or different from each other; k is 1 or 2, wherein a plurality of D$^2$ may be the same as or different from each other when k is 2; f represents an integer from 0 to 3, wherein a plurality of L$^1$ represent different connecting groups when f is 2 or 3; the total number of the groups represented by D$^1$ and D$^2$ (e×m+k) is an integer from 2 to 5, wherein a plurality of D$^1$ and D$^2$ may be the same as or different from each other when e and k are each 2 or more, and a plurality of ((D$^1$)$_e$-(L$^1$)$_f$) may be the same as or different from each other when m is 2 or more.

10. The dichroic dye of claim 9, wherein in the first substituent, D$^2$ is a cis-cyclohexanediyl group and T$^1$ is an alkyl group, and wherein in the second substituent, D$^2$ is a trans-cyclohexanediyl group and T$^1$ is an alkyl group.

11. The dichroic dye of claim 10, wherein T$^1$ in the first substituent and T$^1$ in the second substituent each independently represent an alkyl group having 3 to 10 carbon atoms.

12. A liquid crystal composition comprising:
the dichroic dye of claim 1; and
a liquid crystal compound.

13. The liquid crystal composition of claim 12, wherein the dichroic dye comprises the (i) combination of the first dichroic dye molecule and the second dichroic dye molecule.

14. The liquid crystal composition of claim 12, wherein the dichroic dye comprises the (ii) third dichroic dye molecule.

15. A liquid crystal element comprising:
- a pair of electrodes, at least one of which is a transparent electrode; and
- a liquid crystal layer interposed between the pair of electrodes,
- wherein the liquid crystal layer comprises the liquid crystal composition of claim 12.

16. The liquid crystal element of claim 15, wherein the dichroic dye comprises the (i) combination of the first dichroic dye molecule and the second dichroic dye molecule.

17. The liquid crystal element of claim 15, wherein the dichroic dye comprises the (ii) third dichroic dye molecule.

* * * * *